United States Patent [19]
Porter et al.

[11] Patent Number: 5,446,376
[45] Date of Patent: Aug. 29, 1995

[54] SENSING MOTOR SPEED AND ROTATION DIRECTION

[75] Inventors: Randy D. Porter, Greene; Matthew W. Pankow, Buffalo, both of N.Y.

[73] Assignee: The Raymond Corporation, Greene, N.Y.

[21] Appl. No.: 139,675

[22] Filed: Oct. 22, 1993

[51] Int. Cl.$^6$ .......................... G01P 3/52; G01P 13/00; G08B 21/00
[52] U.S. Cl. ..................................... 324/165; 340/672
[58] Field of Search ............... 324/165, 207.23, 207.16, 324/232, 236; 340/672

[56] References Cited

U.S. PATENT DOCUMENTS

| | | | |
|---|---|---|---|
| 4,142,152 | 2/1979 | Fincher | 324/165 |
| 4,370,614 | 1/1983 | Kawada et al. | 324/165 |

*Primary Examiner*—Walter E. Snow
*Attorney, Agent, or Firm*—Salzman & Levy

[57] ABSTRACT

The present invention features a method and an apparatus for sensing the speed and the direction of rotation of a motor. The apparatus of the invention has a timing wheel disk that is attached to the rotational shaft of a motor and has a number of slots. Opposite the timing wheel are mounted two spaced-together proximity sensors that are a given or a fixed distance apart. The sensors are spaced to read within each slot of the disk at any given point during in the rotation of the timing wheel. When the sensors detect the edges of each slot of the rotating wheel, signals are generated. The sensors respectively define sensing channels A and B. A microcontroller contains a logic program that calculates the motor's speed and direction. Speed is determined by measuring the time that it takes for a point (the edge of a rotating disk's slot) to travel across both sensors. Direction is determined by storing the logic level of the first sensor (channel A) while a generated exclusive OR signal is high, and then analyzing the level of channel A when the exclusive OR is low. Channel A changes logic states over the exclusive OR period when the motor is rotating clockwise; it remains at the same logic state over the exclusive OR period when the motor is rotating counterclockwise. The invention requires no coupling or interface between the sensors. No moving parts are required by this invention, since the timing wheel is mounted directly upon the motor shaft, and the sensors are fixedly mounted adjacent the timing wheel on the brake drum, which requires no special bracketing.

2 Claims, 6 Drawing Sheets

SENSING MOTOR SPEED AND ROTATION DIRECTION

FIELD OF THE INVENTION

The present invention pertains to motor measurements, and, more particularly, to a method and apparatus for measuring the speed and detecting the direction of rotation of a motor shaft.

BACKGROUND OF THE INVENTION

The usual apparatus for measuring the speed and rotational direction of a motor shaft is a dual-channel encoder coupled to the motor shaft. A predetermined number of pulses is generated by each shaft revolution. The encoder counts the number of pulses that occur within a predetermined time period to measure the rotational speed. The direction of rotation is determined by observing which channel is leading or lagging in the respective pulse trains.

The prior method of using the dual-channel encoder to sense a motor's shaft speed and rotational direction has several disadvantages. It has many moving parts, and is an expensive system. In addition, a coupling is usually required between the motor and the encoder. Alternately, the encoder components are designed into the motor at an additional expense.

The present invention seeks to provide speed and direction sensing for a motor with one moving part.

As another of its objectives, the current invention provides the desired speed and direction of rotation for a motor shaft at a reduced cost.

The present invention does not require coupling a sensor to the motor, thus reducing wear and friction, and improving reliability and service life.

DISCUSSION OF RELATED ART

In U.S. Pat. No. 3,944,923 (issued to Luteran on Mar. 16, 1976, for a DEVICE FOR SENSING THE DIRECTION OF MOTION), a system having twin sensors mounted opposite a rotational member is illustrated. Spaced apart, the sensors are in the rotational path of a discontinuity or a single slot in the rotational member. As the member rotates, the discontinuity moves past the sensors; pulses are generated. A logic circuit containing a coincidence detector measures which of the pulses occurs first, before both sensors produce a coincident pulse. This unambiguously furnishes the rotational direction of the spinning member. A signal indicative of the sensed direction is generated by a gating circuit.

The apparatus of Luteran teaches only a means for sensing the direction of a rotating member; it does not show or suggest how the speed of the rotating member can be determined.

SUMMARY OF THE INVENTION

In accordance with the present invention, there are provided a method and an apparatus for sensing the speed and the direction of rotation of a motor shaft. The apparatus of the invention comprises a timing wheel disk that is attached to the rotational shaft of a motor. The timing wheel disk has a number of slots. Opposite the timing wheel are mounted two evenly spaced proximity sensors that are a given or a fixed distance apart. The sensors are spaced to read within each slot of the disk at a given juncture in the rotation of the timing wheel. When the sensors detect the edges of each slot of the rotating wheel, signals are generated. The sensors respectively define sensing channels A and B.

A microcontroller contains a logic program that calculates the motor's speed and direction. Speed is determined by measuring the time that it takes for a point (the edge of a rotating disk's slot) to traverse across both sensors. Direction is determined by storing the logic level of the first sensor (channel A) while a generated exclusive OR signal is high, and then analyzing the level of channel A when the exclusive OR is low. Channel A changes logic states over the exclusive OR period when the motor is rotating clockwise; it remains at the same logic state over the exclusive OR period when the motor is rotating counterclockwise.

The invention requires no coupling or interface between the sensors. Further, it requires no separate moving parts since the timing wheel is mounted directly upon the motor shaft, and the sensors are fixedly mounted adjacent the timing wheel on a bracket rigidly connected to the motor frame or directly to the motor frame itself, or to a brake drum which is rigidly attached to the motor frame. These latter mountings require no special bracketing.

BRIEF DESCRIPTION OF THE DRAWINGS

A complete understanding of the present invention may be obtained by reference to the accompanying drawings, when considered in conjunction with the subsequent detailed description, in which:

FIG. 2b illustrates a block diagram of the logic system used with the apparatus of FIG. 2a;

FIG. 3b depicts a side view of the timing wheel and sensors shown in FIG. 3a.

For purposes of brevity and clarity, like components and elements will bear the same designation throughout the FIGURES.

DESCRIPTION OF THE PREFERRED EMBODIMENT

Generally speaking, the invention is for an apparatus and a method for determining the rotational speed and direction of a motor shaft. The invention features no moving parts and no couplings. A timing wheel is attached to the rotating shaft of the motor. Two adjacent sensors are used to measure the elapsed time for an edge of a slot of a timing wheel to traverse a fixed distance (a logic condition referred to herein as exclusive OR). The sensors are spaced a given distance from each other but are read within the same window. They sense the edges of a slot as the slot rotationally traverses past. The fixed distance of the sensors make possible the determination of the rotational direction and speed of the motor.

Figure 1:
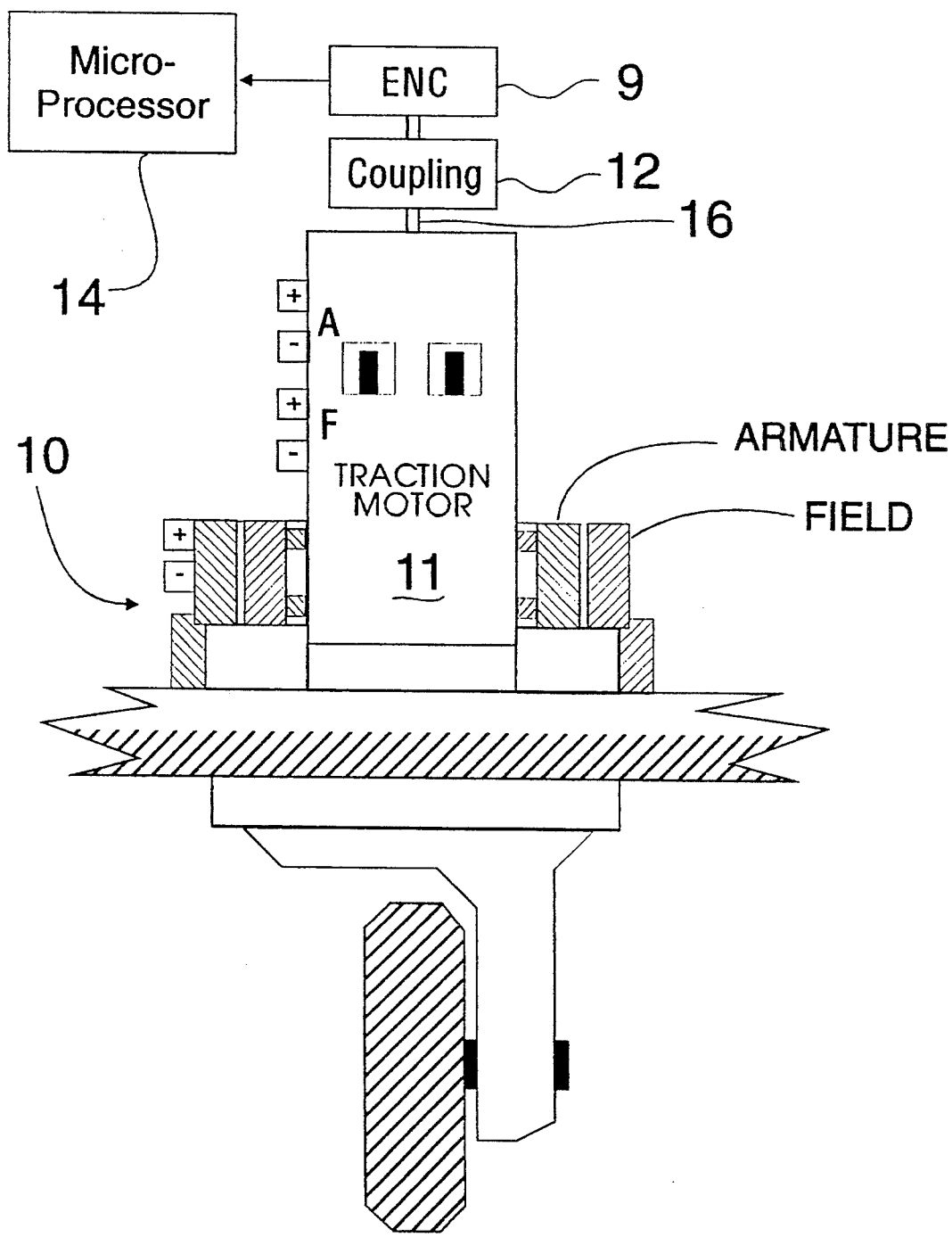
FIG. 1 illustrates a prior art schematic diagram of an encoder system for measuring the speed and the rotational direction of a motor.

Now referring to FIG. 1, a prior art system 10 for measuring the speed and the rotational direction of a motor 11 is shown. A dual-channel encoder 9 is coupled to the rotational shaft 16 of the motor 11 by means of a coupler 12, which is connected to a processing circuit 14.

A predetermined number of pulses is generated by each motor revolution. The encoder 9 counts the number of pulses received within a predetermined time period in order to measure the speed. The direction of rotation is determined by observing the channel that is leading or lagging in the respective pulse trains.

The prior method of using the dual-channel encoder 9 to sense speed and rotational direction for a motor 11 has several disadvantages, among which are its many moving parts and its considerable expense.

Figure 2A:
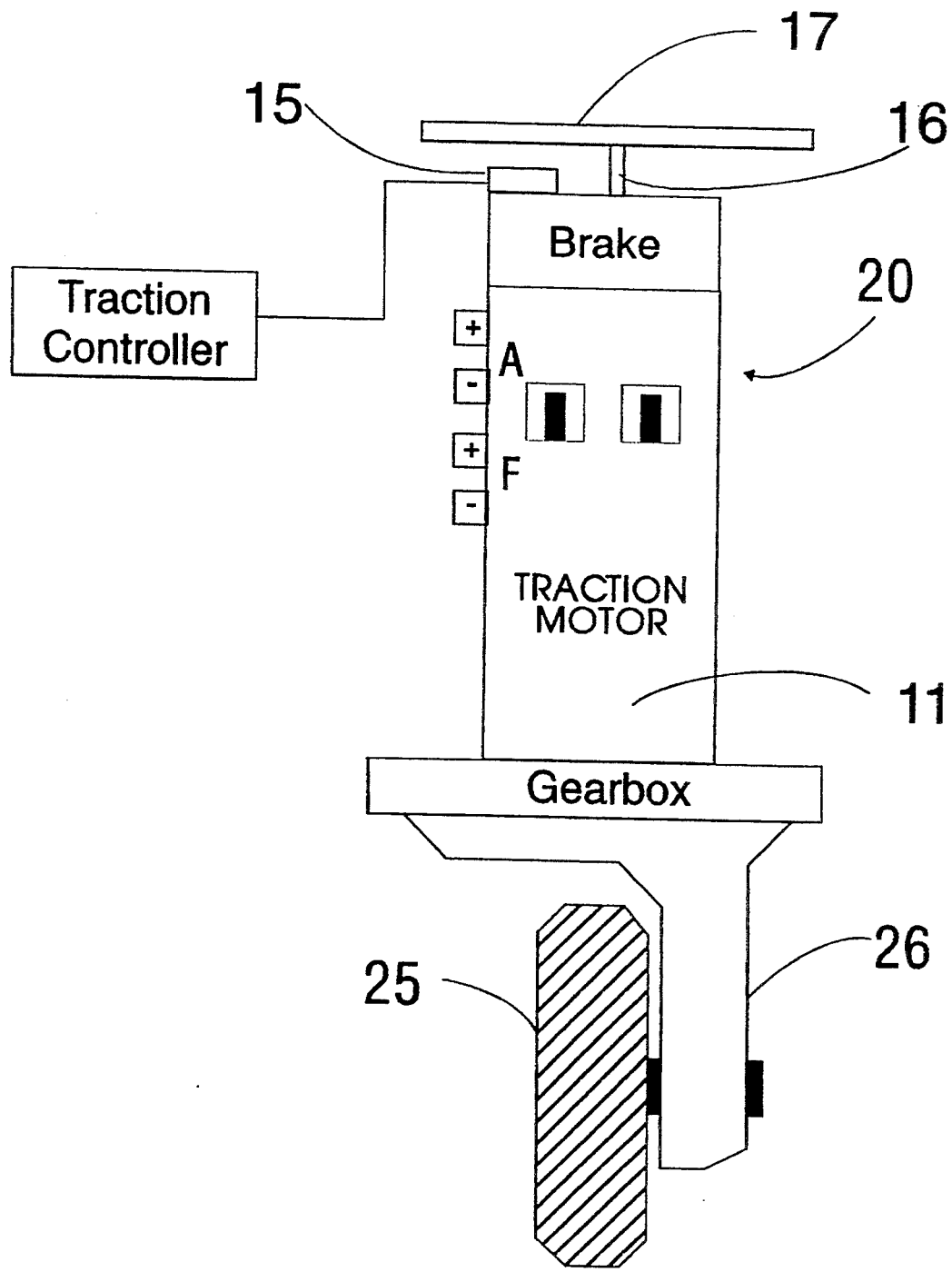
FIG. 2a depicts a schematic diagram of an in-situ view of the speed and rotational direction measuring apparatus of the instant invention.
Figure 2B:
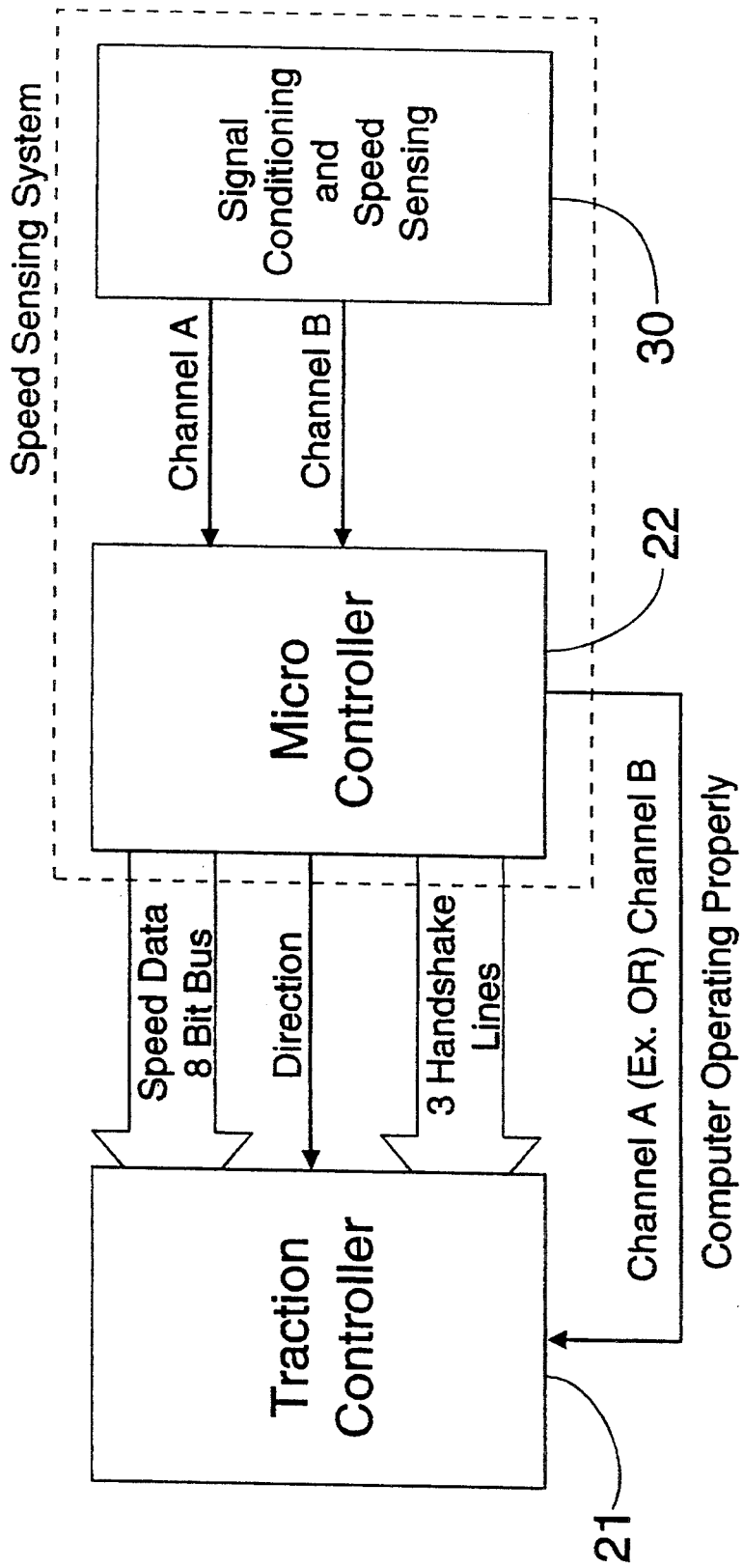

Referring to FIG. 2a, the speed and rotational measuring apparatus 20 of this invention is illustrated. The logic system for operating the apparatus 20 is depicted in FIG. 2b. The apparatus 20 comprises a timing wheel 17 which is mounted to the rotational shaft 16 of the motor 11 by means of a set screw (not shown). Opposite the timing wheel 17 are mounted two spaced-apart proximity sensors 15a and 15b (FIG. 3a) that are, respectively, part of speed sensor 15. The speed sensor 15 is manufactured by Baumer Electric. The pair of sensors 15a and 15b is fixedly mounted to the brake 19 of the motor 11, adjacent the timing wheel 17. The speed sensor 15 is electrically connected via a microcontroller 22 (FIG. 2b) to a traction controller 21. The signals from sensor 15 are converted into speed and rotational direction values, as is explained hereinafter with reference to the timing diagram of FIG. 4. The above timing apparatus 20 can be part of a material handling vehicle having a drive tire 25 that is driven through gear box 26 by motor 11.

Figure 3A:
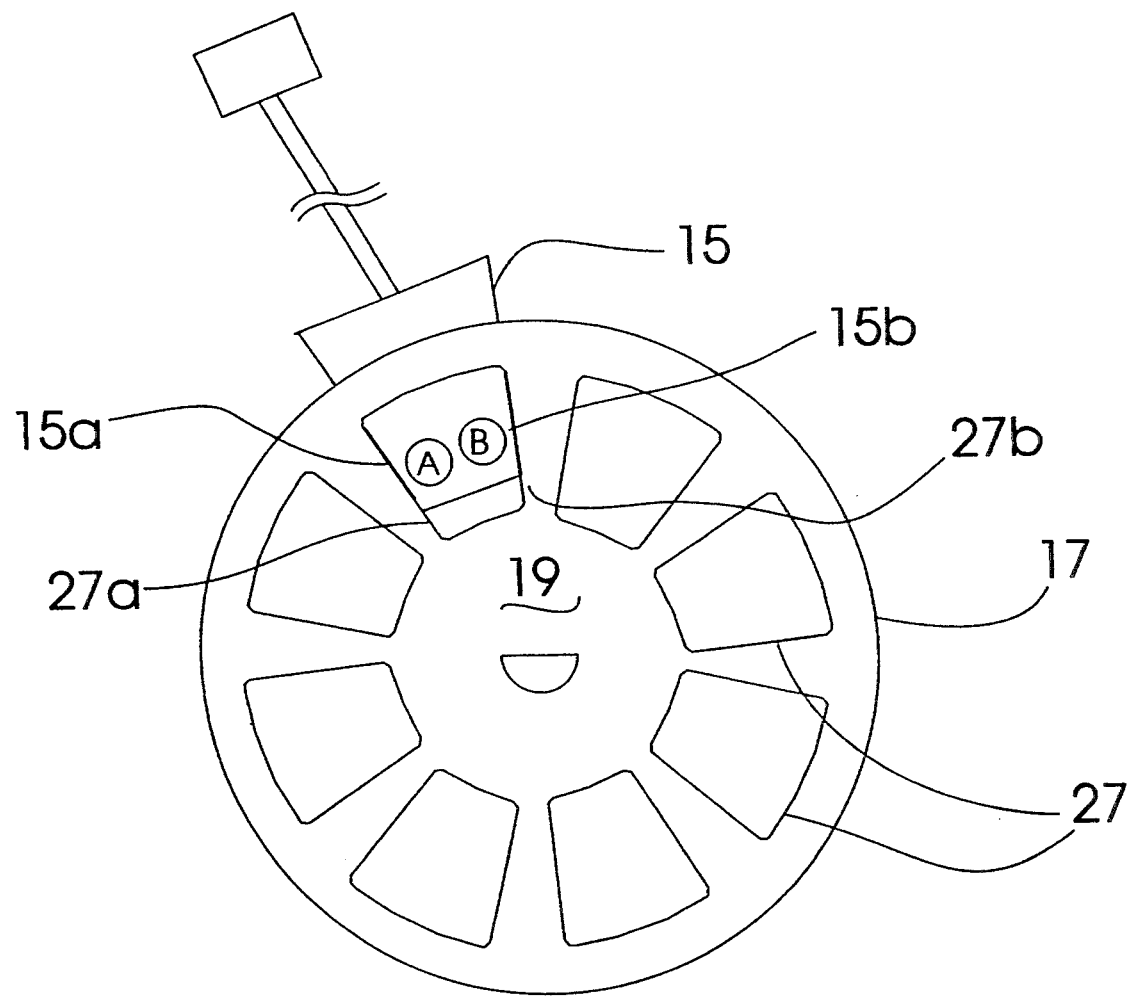
FIG. 3a shows a plan view of the timing wheel and the sensors used in the speed and rotational direction measuring system illustrated in FIG. 2.

Referring to FIG. 3a, a plan view of the timing wheel 17 of system 20 of FIG. 2 is shown. The timing wheel 17 comprises a rotatable disk 19 having a plurality of uniformly spaced slots 27 disposed therein. The proximity sensor 15a is mounted adjacent the leading edge 27a of a slot 27, while the companion sensor 15b is mounted opposite the trailing edge 27b of the slot 27 during clockwise rotation. Of course, the nomenclature for trailing and leading edges reverses when the wheel 17 rotates in a counterclockwise direction.

Figure 3B:
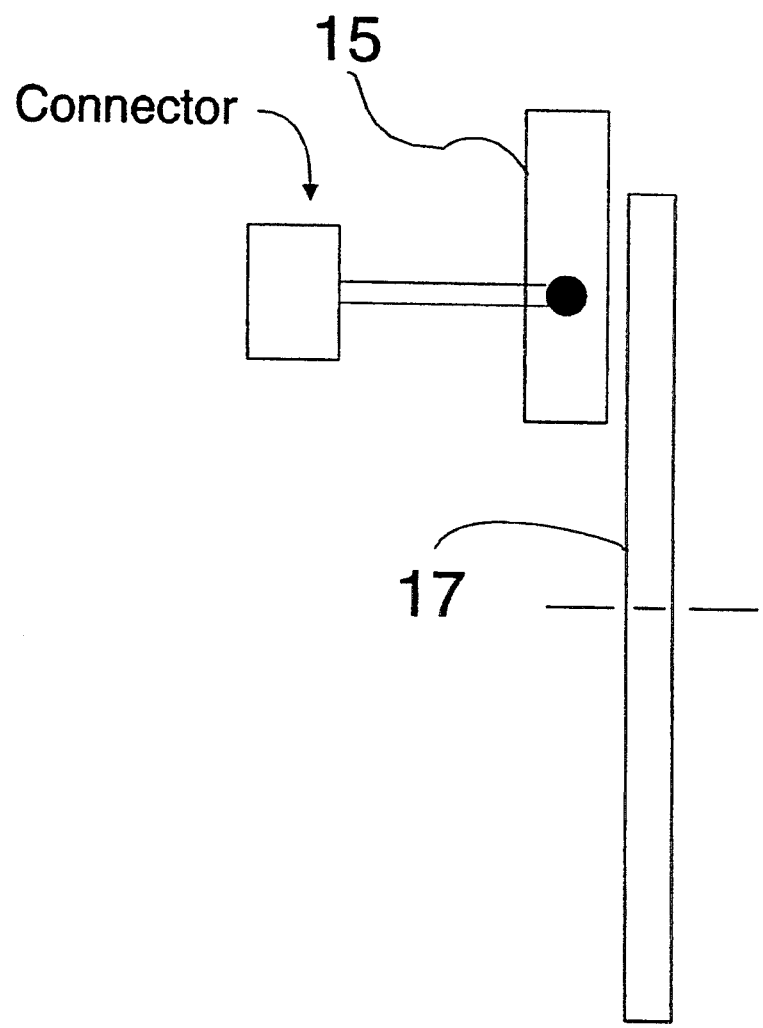

Mounted to read within the slot window 27, the respective sensors 15a and 15b are spaced a given or a fixed distance apart. They are mounted opposite the timing wheel 17, as shown in FIG. 3b. Both the given distance between respective sensors 15a and 15b and the given dimension of slot 27 make possible the determination of the speed and the rotational direction of the timing wheel 17 and, hence, motor 11.

Figure 4:
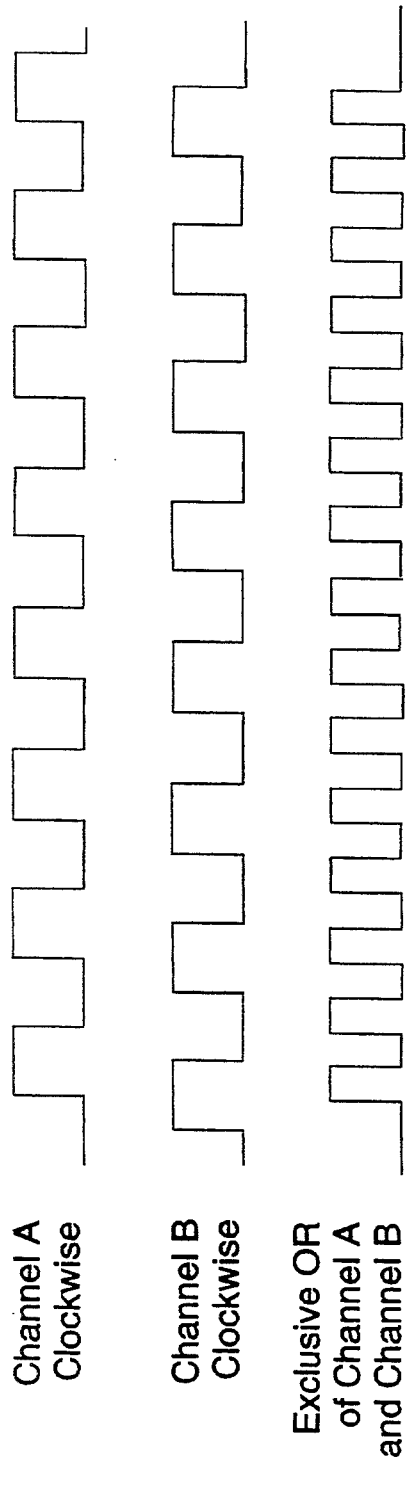
FIG. 4 illustrates a timing diagram of the sensor outputs, featuring exclusive OR conditions for a motor, using the sensing system of the invention shown in FIG. 2.

Referring to FIG. 4, the following time-sensing sequences occur for the clockwise rotation of timing wheel 17:

a) channel A (sensor 15a) encounters metal edge 27a first, and a timer (not shown) is started;
b) Channel B (Sensor 15b) encounters metal edge 27a, and the timer is stopped;
c) the elapsed time is calculated;
d) channel A sensor goes off metal edge 27b, and the timer is started;
e) channel B sensor goes off metal edge 27b, and the timer is stopped; and
f) the elapsed time is once again calculated.

For counterclockwise rotation, the sequence is as follows:

a) channel B sensor encounters metal edge 27b first, and the timer is started;
b) channel A sensor encounters metal edge 27b, and the timer is stopped;
c) the elapsed time is calculated;
d) channel B sensor goes off metal edge 27a, and the timer is started;
e) channel A sensor goes off metal edge 27a, and the timer is stopped; and
f) the elapsed time is once again calculated.

Sensor measurement creates a logic condition which is referred to herein as "exclusive OR". The program of the microprocessor 22 of FIG. 2b outputs the sensor signals from sensors 15a and 15b, respectively, as exclusive OR (as shown in FIG. 4). The exclusive OR signal is generated by microcontroller 22. Each sensor generates a signal when it is opposite a leading or a trailing edge of a slot 27 of the timing wheel 17. The rotational velocity of the timing wheel 17 (and, hence, of the motor 11 itself) is determined by the microcontroller 22, which measures the time that it takes for a single edge of slot 27 to pass both sensors 15a and 15b, respectively. In short, the invention does not measure pulses. Rather, time is measured to indicate when a slot edge 27 (i.e., the edge 27a or 27b thereof) passes over both sensors 15a and 15b, detecting two signals. This provides a velocity measurement, because the timing wheel 17 traverses a given rotational distance as the edge passes and actuates both sensors 15a and 15b.

The rotational direction is determined by storing the logic level of channel A, while the exclusive OR result is high. This is compared with the level of Channel A when the exclusive OR is low. It will be noted from the timing diagrams of FIG. 4 that, if the motor is rotating clockwise, channel A changes logic states over the exclusive OR period. When the motor 11 is rotating counterclockwise, channel A remains at the same logic state over the exclusive OR period.

It is important to note that the tolerances of the slot do not affect the accuracy of the speed measurement, since the distance between the respective sensors 15a and 15b is fixed. Any change in the slot width alters the number of slots counted per period (i.e., how often the speed is calculated).

The invention requires no coupling or interface between the sensors. There are no moving parts in this invention, since the timing wheel 17 is mounted directly upon the shaft 16 of the motor 11, and the sensors 15a and 15b fixedly mounted adjacent the timing wheel 17.

The circular disk 17 is fabricated from a ferrous metal and has a specific number of slots. The slots 27 are of a specific size and shape and are spaced over a specific interval to yield a minimum acceptable resolution. The maximum diameter of the disk is determined by vehicle packaging restraints. The minimum diameter of the disk is determined by slot-width spacing and the number of slots required to yield acceptable resolution and accuracy. Only one slot is required to determine the motor's rpm; at very slow speeds, the time between velocity updates will be quite long with fewer slots. The minimum slot width is restricted by the spacing of the sensing heads. Both sensors must fit within the width of the slot with enough clearance to not sense metal. The maximum number of slots is determined by the disk diameter and the distance between slots. The minimum slot spacing is dictated by enough material between slots so that the two sensor heads can sense the metal.

The sensor consists of a modified solid-state code reader with two sensors of the NAMUR type, Model No. DIN19234. The sensors have a common supply connection and two outputs, channel A and channel B. The part is manufactured by Baumer Electric, Ltd. (This device normally has three channels, but the third is omitted for this invention.) Each sensor has an internal oscillator that is affected by the presence of metal. The channel A sensor operates at a different frequency from that of the channel B sensor. This allows the sensors to be placed very close together without interfering with the other's respective output signal. This also allows the slot width to be narrower than if conventional proximity sensors were used. Conventional proximity sensors have a minimum spacing that must be maintained so that they do not interfere with each other. The narrower the slot, and the more slots per disk, the greater the measuring resolution. Another benefit of having the sensors close together is that the metal can also be sensed between the slots, thus doubling the resolution.

It should be noted that NAMUR-type proximity switches are electronic sensors in which the current consumption varies when a metal object approaches. (This is an analog-type output.)

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for sensing both the speed and the direction of rotation of a motor, comprising:
   a rotating timing wheel having means for attachment to a rotational shaft of a motor, said timing wheel having a plurality of slots on a face portion thereof, each slot of said plurality of slots having a leading edge and a trailing edge, each rotationally spaced apart at a given angle on said timing wheel;
   two spaced-apart sensors, with each comprising an oscillator, and each oscillator operating at a different frequency from the other, said sensors fixedly mounted adjacent the face portion of said timing wheel, said sensors being mounted a given or a fixed distance apart and mounted opposite said timing wheel, so that during the rotation of said rotating timing wheel, both sensors will read within one slot of said plurality of slots, each of said sensors generating a signal when it is opposite said leading edge or said trailing edge of said slot of the rotating timing wheel; and
   measuring means electrically connected to said sensors and having logic programming for receiving signals from said sensors and for determining the rotational velocity and the rotational direction of the timing wheel and, hence, the motor, said programming including logic for determining the rotational direction of the motor by means of a program that creates and interprets exclusive OR, a condition that is dependent upon one of the sensors being logically high and changing state during a clockwise rotation.

2. The apparatus for sensing both the speed and the direction of rotation of a motor in accordance with claim 1, wherein the programming of said measuring means includes logic for determining the rotational direction of the motor by means of a program that creates and interprets exclusive OR, a condition that is dependent upon one of the sensors being logically high and changing state, during a clockwise rotation.

* * * * *